April 16, 1935.   C. T. SWEANY   1,998,293
SELF PROPELLED SCOOTER VEHICLE
Filed Sept. 18, 1933
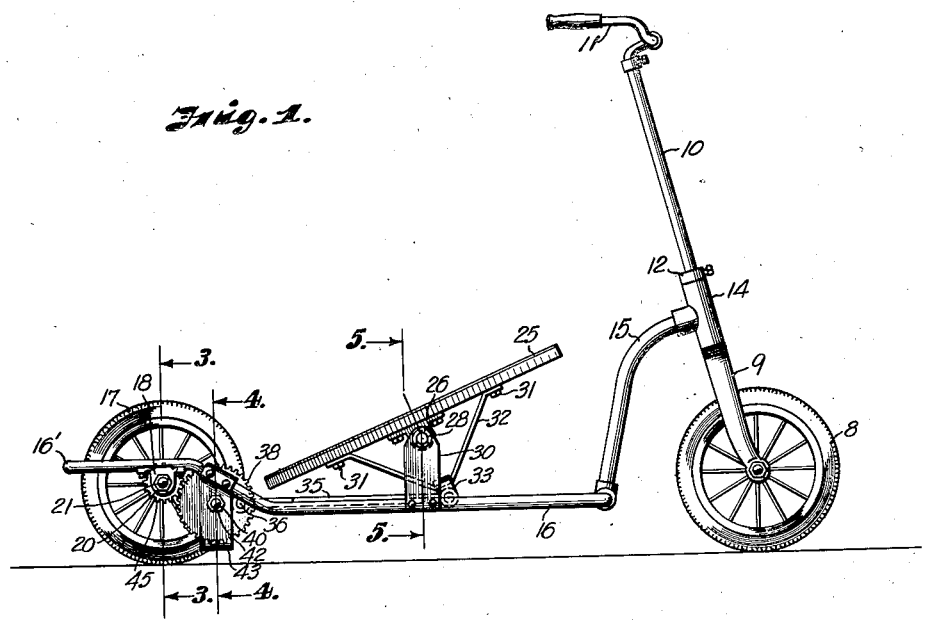
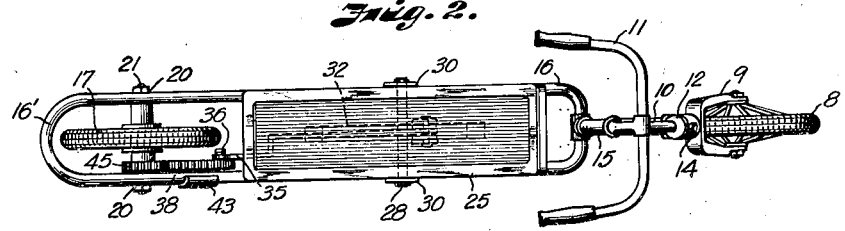
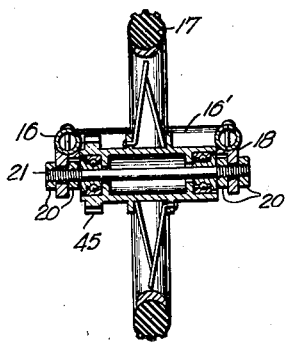
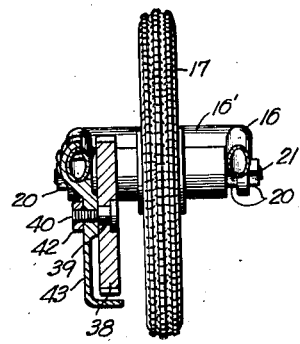
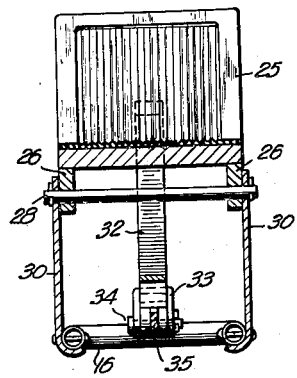
INVENTOR:
C. T. Sweany,
BY Chas. W. Gerard
ATTORNEY Patented Apr. 16, 1935

1,998,293

UNITED STATES PATENT OFFICE 1,998,293

SELF-PROPELLED SCOOTER VEHICLE

Clyde T. Sweany, Kansas City, Kans.

Application September 18, 1933, Serial No. 689,899

1 Claim. (Cl. 208—34)

The present invention relates to toy vehicles, and aims to devise a novel and improved type of two-wheeled or so-called "scooter" type of construction, in which a suitable treadle-operated means is incorporated as a part of the vehicle to enable the rider to propel the same by appropriate movements of his body.

Accordingly, the invention comprises a two-wheeled vehicle of the scooter type, with a low suspension frame between the wheels carrying a supporting member for the rider in the form of a treadle provided with suitable operating connections to the rear wheel of the vehicle, whereby the latter is propelled by appropriate manipulation of the rider for oscillating the treadle or supporting member.

With the foregoing general objects in view, as well as minor objects, as will appear in the course of the detailed specification, the invention will now be described by reference to the accompanying drawing illustrating a suitable form of embodiment for practicing the invention, after which those features and combinations deemed to be novel will be particularly set forth and claimed.

In the drawing—

Figure 1 is a side elevation, illustrating a vehicle construction embodying the present invention;

Figure 2 is a plan view of the same; and

Figures 3, 4 and 5 are transverse sections, on an enlarged scale, representing sections taken on the lines 3—3, 4—4 and 5—5, respectively, of Figure 1.

Referring now to the drawing in detail, the improved construction is shown as comprising a vehicle having in the main the general appearance of a two-wheel scooter ordinarily propelled by the rider standing with one foot on a platform between the wheels and pushing the device along by means of the other foot engaging the ground alongside the path of the vehicle. Accordingly the construction provides a front or steering wheel 8 journaled in the yoke frame 9 carrying the steering column 10 and handle bars 11, said column 10 having a set collar 12 for engaging the top of a steering column bearing 14, all as shown in Figures 1 and 2. The bearing 14 is carried by the front end of the framework connecting the wheels, which frame-work comprises a front suspension post 15 attached to the front end of a skeleton frame 16 carried in low-hung relation, as represented in Figure 1; the rear portion of this frame 16 provides a guard 16' for the rear wheel 17 journaled in underslung bearing brackets 18 attached to said frame 16 and equipped with clamping nuts 20 for securing the axle 21 of the wheel bearings 32, which may be of conventional roller-bearing type as shown in Figure 3.

Ordinarily the scooter type of vehicle simply provides a platform in the form of a drop frame corresponding to the frame 16, on which the rider stands with one foot while pushing the scooter along with the other foot. In the present construction, in lieu of such a platform I provide a treadle support 25 designed for the support of both feet of the rider, this support being of suitable length and provided with brackets 26 for pivotally mounting the same upon a transverse pin 28 (see Figure 5) which is supported by side bracket plates 30 carried in upright position by the sides of the frame 16.

Attached to the bottom face of the treadle 25, as by screws 31, is an approximately V-shaped frame piece 32 of strap iron, at the angle of which is attached a clip 33 carrying a bolt 34 for pivotal connection with the forward end of a pitman rod 35, the rear end of which connects pivotally with a wrist pin 36 carried by a gear 38 journaled on the shoulder portion 39 of a screw 40 attached by a nut 42 to the inner face of a bracket plate 43. This plate is attached to one side of the frame 16, and its lower edge is turned inward beneath the gear 38 to form a guard therefor. The gear 38 meshes with a pinion 44 formed as a part of the hub portion of the rear wheel 17, as clearly shown in Figure 3.

By means of this construction it is apparent that with the rider mounted thereon in standing position, with both feet upon the treadle member, and in such a way as to alternately shift his weight first to one side and then to the other side of the axis of the pin 28, an oscillating movement is imparted to said treadle which is transmitted by means of the pitman 35 to the gears 38, 45, and thereby operates to drive the rear wheel 17 and thus propel the vehicle. The rider has only to assume a proper upright position upon the treadle member, while grasping the handle bar 11 for steering purposes, and then by appropriate bodily movements, forward and backward, operate the propelling mechanism at any desired speed. Obviously the necessary pedaling effort is varied as required by simply shifting the feet nearer to or farther away from the axis of the treadle member, as may be readily determined by the individual rider.

It will thus be apparent that I have devised a simple, practical and highly efficient arrangement and construction for fulfilling the desired objects of the invention, as regards a scooter propelling mechanism, which is adapted to furnish both amusement and healthful exercise for the users of such vehicles, and while I have illustrated and described what I now regard as the preferred form of construction for embodying my invention, I desire to be understood as reserving the right to make whatever changes or modifications may fairly fall within the spirit and scope of the appended claim.

Having described my invention, what I claim to be new and desire to secure by Letters-Patent is:

A two-wheeled scooter vehicle comprising an elongated open frame, an upwardly extending member secured to the forward end of the frame, a steering fork connected to the upwardly extending member, a wheel and steering handle connected to the fork, a supporting wheel mounted within the sides of the frame at the rear end thereof, a partial gear guard and support secured to and depending from one side of the frame adjacent to the last-named wheel, a gear train associated with said last-named wheel and gear-supporting guard, a standard mounted on each side of and intermediate the ends of the frame, a pedal pivotally attached to the upper ends of said standards, a bracket depending from the pedal and secured thereto at opposite sides of the pivot of the pedal, and a pitman pivotally secured to one of the gears of the train and to the lower end of the bracket.

CLYDE T. SWEANY.